(12) United States Patent
Yamanaka et al.

(10) Patent No.: US 7,968,189 B2
(45) Date of Patent: Jun. 28, 2011

(54) REMOVABLE ADHESIVE COMPOSITION, REMOVABLE ADHESIVE LAYER, ADHESIVE SHEET, AND SURFACE PROTECTIVE MATERIAL

(75) Inventors: Takeshi Yamanaka, Osaka (JP); Kooki Ooyama, Osaka (JP)

(73) Assignee: Nitto Denko Corporation, Osaka (JP)

( * ) Notice: Subject to any disclaimer, the term of this patent is extended or adjusted under 35 U.S.C. 154(b) by 266 days.

(21) Appl. No.: 11/816,900

(22) PCT Filed: Feb. 6, 2006

(86) PCT No.: PCT/JP2006/301973
§ 371 (c)(1),
(2), (4) Date: Aug. 22, 2007

(87) PCT Pub. No.: WO2006/090572
PCT Pub. Date: Aug. 31, 2006

(65) Prior Publication Data
US 2009/0022925 A1 Jan. 22, 2009

(30) Foreign Application Priority Data
Feb. 23, 2005 (JP) .................................. 2005-047371

(51) Int. Cl.
*B32B 27/30* (2006.01)
*B32B 33/00* (2006.01)
*C08L 33/02* (2006.01)
(52) U.S. Cl. ................ 428/355 AC; 428/41.3; 524/522; 524/457; 524/458; 524/461; 524/91; 526/89; 526/173; 526/201; 526/217
(58) Field of Classification Search .................. 524/457, 524/458, 461, 86, 91, 99, 522, 556; 428/355 AC, 428/41.3; 526/89, 173, 201, 217
See application file for complete search history.

(56) References Cited

U.S. PATENT DOCUMENTS

| | | | |
|---|---|---|---|
| 5,162,475 A | 11/1992 | Tang et al. | |
| 5,952,420 A | 9/1999 | Senkus et al. | |
| 6,518,343 B1 * | 2/2003 | Lucast et al. | .............. 524/276 |
| 6,869,678 B2 * | 3/2005 | Yamanaka et al. | ...... 428/355 AC |
| 2003/0124346 A1 * | 7/2003 | Yamanaka et al. | ...... 428/355 AC |

FOREIGN PATENT DOCUMENTS

| | | |
|---|---|---|
| EP | 0 194 881 | 9/1986 |
| JP | 6-128543 | 5/1994 |
| JP | 2001-131512 | 5/2001 |
| JP | 2001-164221 | 6/2001 |
| JP | 2003-082304 | 3/2003 |

OTHER PUBLICATIONS

Supplementary European Search Report issued on the corresponding European Patent Application No. EP06713116, dated Feb. 4, 2008.
International Search Report issued on the corresponding International Application No. PCT/JP2006/301973, dated Apr. 18, 2006.

* cited by examiner

*Primary Examiner* — Michael M Bernshteyn
(74) *Attorney, Agent, or Firm* — Knobbe Martens Olson & Bear LLP

(57) ABSTRACT

Provided is a re-peeling pressure-sensitive adhesive composition for a surface protecting material for an adherend having a photocatalytic layer, comprising: a (meth)acryl-based polymer including, as monomer units, 50 to 99.9% by weight of (A) at least one acrylate-based monomer represented by the general formula (1): $CH_2=CR_1COOR_2$ wherein $R_1$ represents a hydrogen atom or a methyl group, and $R_2$ represents an alkyl group having 2 to 14 carbon atoms, 0.1 to 10% by weight of (B) a functional-group-containing vinyl-based monomer, and 0 to 49.9% by weight of (C) a vinyl-based monomer copolymerizable with the component (A) and/or the component (B); and (D) a surfactant having a molecular weight of 150 to 5000, the amount of the component (D) being from 0.01 to 30 parts by weight with respect to 100 parts by weight of the (meth)acryl-based polymer. The re-peeling pressure-sensitive adhesive composition is excellent in re-peeling property, contact-angle-recoverability, and weather resistance.

8 Claims, No Drawings

US 7,968,189 B2

REMOVABLE ADHESIVE COMPOSITION, REMOVABLE ADHESIVE LAYER, ADHESIVE SHEET, AND SURFACE PROTECTIVE MATERIAL

This application is the U.S. National Phase under 35 U.S.C. §371 of International Application No. PCT/JP2006/301973, filed Feb. 6, 2006, which claims priority to the Japanese Patent Application No. 2005-047371, filed Feb. 23, 2005. The International Application was not published in English under PCT Article 21(2).

TECHNICAL FIELD

The present invention relates to a re-peeling pressure-sensitive adhesive composition, more specifically, a re-peeling pressure-sensitive adhesive composition used for a surface protecting material for an adherend having a photocatalytic layer. The invention also relates to a re-peeling pressure-sensitive adhesive layer made of the pressure-sensitive adhesive composition. Furthermore, the invention relates to an pressure-sensitive adhesive sheet having the pressure-sensitive adhesive layer, and a surface protecting material wherein the pressure-sensitive adhesive sheet is used.

BACKGROUND ART

In recent years, the use of photocatalysts has been started in pieces of glass as members for buildings, outer walls/inner walls of buildings, side mirrors of automobiles, coatings for automobiles, sound-roof walls for highways, antibacterial towels, and air clearers from various viewpoints of staining, dust-proofing, decontamination, anti-bacteria, and others. In such markets, a drastic expansion thereof in the future is forecasted. In particular, members used outdoors out of members for buildings have a self-cleaning effect that contaminants adhering to the surface thereof are caused to flow out by ultraviolet rays and rain; thus, the expansion of the markets thereof is expected very much.

In antifouling films applied or attached to the surface of these members, for example, $TiO_2$, $ZnO$, $ZrO_2$ or $SrTiO_3$ is used as a photocatalyst. The surface of the photocatalyst is activated when the surface is The surface of the photocatalyst is activated when the surface is subjected to the radiation of ultraviolet rays. The adhering contaminants are then decomposed. Furthermore, a self-cleaning effect that the contaminants (or decomposed products of the contaminants) are easily washed away by rain or the like can be obtained.

However, when the various members, wherein a photocatalyst is formed, are each stored, transported, worked or applied, the layer of the photocatalyst may be damaged. Once the layer is damaged, loss of time, processing, and costs is generated on the basis of the step of repairing the layer. Thus, works for the repair on the spot are very difficult. In recent years, therefore, a protecting material has been desired for protecting the photocatalytic layer in the step of forming the photocatalytic layer, and at the time of forwarding or storing the member.

Hitherto, a material for protecting a photocatalytic layer has been suggested as a trial for overcoming the above-mentioned problem. For example, disclosed is a protecting material for a photocatalyst wherein a polyepoxy compound is blended with an acryl-based polymer (see, for example, Patent Document 1). However, it has been proved that the application of the protecting material to these members, which are poor in weather resistance and are frequently stored and protected in particular outdoors is insufficient even in accordance with this suggestion.

Patent Document 1: JP-A-2003-82304

DISCLOSURE OF THE INVENTION

Problems to be Solved by the Invention

An object of the invention is to provide a re-peeling pressure-sensitive adhesive composition excellent in re-peeling property and contact-angle-recoverability and suitable for a surface protecting material for an adherend having a photocatalytic layer. Another object thereof is to provide a re-peeling pressure-sensitive adhesive composition excellent in weather resistance, re-peeling property and contact-angle-recoverability and suitable for a surface protecting material for an adherend having a photocatalytic layer. A further object thereof is to provide a re-peeling pressure-sensitive adhesive layer including the pressure-sensitive adhesive composition, a pressure-sensitive adhesive sheet wherein the pressure-sensitive adhesive layer is used, and a surface protecting material wherein the pressure-sensitive adhesive sheet is used.

Means for Solving the Problems

The inventors have repeatedly made eager researches to attain the objects, so that the present invention has been made.

Accordingly, the re-peeling pressure-sensitive adhesive composition of the invention is: a re-peeling pressure-sensitive adhesive composition, which is used for a surface protecting material for an adherend having a photocatalytic layer, including: a (meth)acryl-based polymer containing, as monomer units, 50 to 99.9% by weight of (A) at least one acrylate-based monomer represented by the following general formula (1): $CH_2{=}CR_1COOR_2$, wherein $R_1$ represents a hydrogen atom or a methyl group, and $R_2$ represents an alkyl group having 2 to 14 carbon atoms, 0.1 to 10% by weight of (B) a functional-group-containing vinyl-based monomer, and 0 to 49.9% by weight of (C) a vinyl-based monomer copolymerizable with the component (A) and/or the component (B); and (D) a surfactant having a molecular weight of 150 to 5000, the amount of the component (D) being from 0.01 to 30 parts by weight with respect to 100 parts by weight of the (meth)acryl-based polymer.

According to the invention, a re-peeling pressure-sensitive adhesive layer using the re-peeling pressure-sensitive adhesive composition, wherein a specific amount of a surfactant having a molecular weight of 150 to 5000 is blended with a (meth)acryl-based polymer having the above-mentioned specific monomer units, exhibits a small rise in tackiness onto an adherend having a photocatalytic layer with time, so as to have excellent re-peeling property and contact-angle-recoverability, as will be described as results of Examples.

Details of the reason why the above-mentioned pressure-sensitive adhesive layer expresses such properties are unclear; however, the reason is presumed as follows: when the surface of the photocatalytic layer is caused to adsorb the surfactant, there is obtained an advantageous effect that the re-peeling property of an pressure-sensitive adhesive sheet (surface protecting material) is made good; and after the sheet is peeled off also, the adsorbed surfactant is easily decomposed by the activation of the photocatalyst so that the recovery of the hydrophilicity (contact-angle-recoverability) of the photocatalytic layer is easily caused.

In the invention, a (meth)acryl-based polymer means an acryl-based polymer and/or a methacryl-based polymer. (Meth)acrylate means acrylate and/or methacrylate, and a (meth)acrylate-based monomer means an acrylate-based monomer and/or a methacrylate-based monomer. An alkyl (meth)acrylate means an alkyl acrylate and/or an alkyl methacrylate.

The (meth) acryl-based polymer in the invention is a polymer made mainly of a (meth)acrylic acid ester having an alkyl group having 2 to 14 carbon atoms. When this polymer is used as a base polymer of a re-peeling pressure-sensitive adhesive composition, an pressure-sensitive adhesive composition excellent in re-peeling property is produced.

In the re-peeling pressure-sensitive adhesive composition of the invention, the surfactant (D), which has a molecular weight of 150 to 5000, is contained in an amount of 0.01 to 30 parts by weight, preferably 0.5 to 20 parts by weight, more preferably 0.1 to 10 parts by weight with respect to 100 parts by weight of the (meth)acryl-based polymer. If the amount is less than 0.01 part by weight, the contact-angle-recoverability may be poor. On the other hand, if the amount is more than 30 parts by weight, a bad effect may be produced on the endurance, the staining property, and others.

In the invention, 0.1 to 6 parts by weight of a weather-resistant stabilizer are contained with respect to 100 parts by weight of the (meth)acryl-based polymer. The incorporation of the predetermined amount of this weather-resistant stabilizer gives a re-peeling pressure-sensitive adhesive composition excellent in weather resistance, re-peeling property, and contact-angle-recoverability.

The weather-resistant stabilizer in the invention is an ultraviolet absorbent, a light stabilizer, or an antioxidant. These compounds may be used alone or in the form of a mixture of two or more thereof as the weather-resistant stabilizer.

Furthermore, in the re-peeling pressure-sensitive adhesive composition of the invention, it is preferred that the change ratio y between adhesive strengths which is calculated out from the following expression (2) is from 0.01 to 10:

$$y=Fb/Fa \quad (2)$$

wherein y: change ratio (–) between adhesive strengths, Fa: the initial adhesive strength (N/10-mm) onto the adherend having the photocatalytic layer, and Fb: the adhesive strength (N/10-mm) onto the adherend having the photocatalytic layer after the composition adhering to the adherend undergoes an accelerated weather resistance test.

By use of the re-peeling pressure-sensitive adhesive composition having the change ratio, there is produced a member excellent in weather resistance, re-peeling property, and contact-angle-recoverability and suitable for a surface protecting material for an adherend having a photocatalytic layer.

The re-peeling pressure-sensitive adhesive composition layer of the invention comprises the re-peeling pressure-sensitive adhesive composition described in any one of the above-mentioned paragraphs. Since the re-peeling pressure-sensitive adhesive layer of the invention comprises the pressure-sensitive adhesive composition which produces effects and advantageous as described above, this re-peeling pressure-sensitive adhesive layer is an pressure-sensitive adhesive layer excellent in re-peeling property and contact-angle-recoverability and suitable for a surface protecting material for an adherend having a photocatalytic layer. Furthermore, in the case of using the pressure-sensitive adhesive composition having the predetermined amount of a weather-resistant stabilizer, the re-peeling pressure-sensitive adhesive layer is an pressure-sensitive adhesive layer excellent in weather resistance, re-peeling property and contact-angle-recoverability and suitable for a surface protecting material for an adherend having a photocatalytic layer.

Furthermore, the adhesive tape of the invention is a tape wherein a re-peeling pressure-sensitive adhesive layer formed on one side or both sides of a support and comprises the re-peeling pressure-sensitive adhesive composition described in any one of the above-mentioned paragraphs. Since the pressure-sensitive adhesive sheet of the invention has the pressure-sensitive adhesive layer which produces effects and advantageous as described above, this pressure-sensitive adhesive sheet is an pressure-sensitive adhesive sheet excellent in re-peeling property and contact-angle-recoverability and suitable for a surface protecting material for an adherend having a photocatalytic layer. Furthermore, in the case of using the pressure-sensitive adhesive composition having the predetermined amount of a weather-resistant stabilizer, the pressure-sensitive adhesive sheet is an pressure-sensitive adhesive sheet excellent in weather resistance, re-peeling property and contact-angle-recoverability and suitable for a surface protecting material for an adherend having a photocatalytic layer.

It is preferred that the support is a support made of a plastic substrate subjected to masking treatment. In the case of using the pressure-sensitive adhesive composition containing the predetermined amount of a weather-resistant stabilizer, the use of this support causes this composition to be more certainly rendered a composition excellent in weather resistance, re-peeling property and contact-angle-recoverability and suitable for a surface protecting material for an adherend having a photocatalytic layer. In the case of using the pressure-sensitive adhesive composition containing no weather-resistant stabilizer, the use of this support also causes this composition to be rendered a composition excellent in weather resistance, re-peeling property and contact-angle-recoverability and suitable for a surface protecting material for an adherend having a photocatalytic layer.

In the invention, the masking treatment means any treatment conducted to keep an object out of exposure to ultraviolet rays or the like. Examples thereof include coloring with a pigment, and kneading of a weather-resistant stabilizer into a plastic film.

The surface protecting material of the invention is a surface protecting material wherein one or more species of the above-mentioned pressure-sensitive adhesive sheet are used. This has a function excellent in re-peeling property and contact-angle-recoverability and is suitable for a surface protecting material for an adherend having a photocatalytic layer. Furthermore, in the case of using the pressure-sensitive adhesive composition containing the predetermined amount of a weather-resistant stabilizer, the composition has a function excellent in weather resistance, re-peeling property and contact-angle-recoverability and is suitable for a surface protecting material for an adherend having a photocatalytic layer.

BEST MODE FOR CARRYING OUT THE INVENTION

Embodiments of the invention will be described in detail hereinafter.

The re-peeling pressure-sensitive adhesive composition of the invention is: a re-peeling pressure-sensitive adhesive composition, which is used for a surface protecting material for an adherend having a photocatalytic layer, containing: a (meth)acryl-based polymer containing, as monomer units, 50 to 99.9% by weight of (A) at least one acrylate-based monomer represented by the following general formula (1): $CH_2=CR_1COOR_2$, wherein $R_1$ represents a hydrogen atom or a methyl group, and $R_2$ represents an alkyl group having 2 to 14 carbon atoms, 0.1 to 10% by weight of (B) a functional-group-containing vinyl-based monomer, and 0 to 49.9% by weight of (C) a vinyl-based monomer copolymerizable with the component (A) and/or the component (B); and (D) a surfactant having a molecular weight of 150 to 5000, the amount of the component (D) being from 0.01 to 30 parts by weight with respect to 100 parts by weight of the (meth) acryl-based polymer.

As the (meth)acryl-based polymer used in the invention, there is used a polymer including, as monomer units, 50 to 99.9% by weight of (A) at least one acrylate-based monomer represented by the following general formula (1): $CH_2=CR_1COOR_2$, wherein $R_1$ represents a hydrogen atom or a methyl group, and $R_2$ represents an alkyl group having 2 to 14 carbon atoms, 0.1 to 10% by weight of (B) a functional-group-containing vinyl-based monomer, and 0 to 49.9% by weight of (C) a vinyl-based monomer copolymerizable with the component (A) and/or the component (B).

As the component (A) in the invention, there is used at least one acrylate-based monomer represented by the following general formula (1): $CH_2=CR_1COOR_2$, wherein $R_1$ represents a hydrogen atom or a methyl group, and $R_2$ represents an alkyl group having 2 to 14 carbon atoms, this monomer being an alkyl (meth)acrylate.

The alkyl (meth)acrylate is not particularly limited as long as this ester is a (meth)acrylate-based monomer having an alkyl group having 2 to 14 carbon atoms. The ester preferably has 3 to 13 carbon atoms, and more preferably has 4 to 12 carbon atoms. The alkyl group which can be used and has 5 or more carbon atoms may have a linear chain or a branched chain. An alkyl group having a branched chain is preferred since the glass transition point thereof is low.

Examples of the (meth)acrylate-based monomer, which is represented by the general formula (1) and has an alkyl group having 2 to 14 carbon atoms, include ethyl (meth)acrylate, propyl (meth)acrylate, n-butyl (meth)acrylate, isobutyl (meth)acrylate, sec-butyl (meth)acrylate, t-butyl (meth)acrylate, hexyl (meth)acrylate, cyclohexyl (meth)acrylate, t-butylcyclohexyl (meth)acrylate, isoamyl (meth)acrylate, 2-ethylhexyl (meth)acrylate, n-pentyl (meth)acrylate, isopentyl (meth)acrylate, cyclopentyl (meth)acrylate, n-octyl (meth)acrylate, isooctyl (meth)acrylate, cyclooctyl (meth)acrylate, n-nonyl (meth)acrylate, isononyl (meth)acrylate, n-decyl (meth)acrylate, isodecyl (meth)acrylate, n-dodecyl (meth)acrylate, isomyristyl (meth)acrylate, n-tridecyl (meth)acrylate, and n-tetradecyl (meth)acrylate. In particular, ethyl (meth)acrylate, n-butyl (meth)acrylate, isobutyl (meth)acrylate, sec-butyl (meth)acrylate, t-butyl (meth)acrylate, or 2-ethylhexyl (meth)acrylate is preferably used.

In the invention, the above-mentioned (meth)acrylate-based monomers, which have an alkyl group having 2 to 14 carbon atoms, may be used alone, or may be used in the form of a mixture of two or more thereof. The content of the whole of the monomer(s) is 50% or more by weight, preferably 55 to 99.9% by weight, more preferably 59 to 80% by weight of the whole of the monomers of the (meth)acrylate polymer. If the content is less than 50% by weight, the initial adhesive strength may be low.

As the component (B) in the invention, a functional-group-containing vinyl monomer is used. The functional-group-containing vinyl monomer used in the invention is used to improve the adhesion to a substrate and make the initial tackiness to an adherend good.

Examples of the functional-group-containing vinyl monomer in the invention include a carboxyl-group-containing monomer, an acid-anhydride-group-containing monomer, and a hydroxyl-group-containing monomer.

Examples of the carboxyl-group-containing monomer include acrylic acid, methacrylic acid, carboxyethyl (meth)acrylate, carboxypentyl (meth)acrylate, itaconic acid, maleic acid, fumaric acid, and crotonic acid. In particular, acrylic acid and methacrylic acid are preferably used.

Examples of the acid-anhydride-group-containing monomer include maleic anhydride and itaconic anhydride.

Examples of the hydroxyl-group-containing monomer include 2-hydroxyethyl (meth)acrylate, 2-hydroxypropyl (meth)acrylate, 4-hydroxybutyl (meth)acrylate, 2-hydroxyhexyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methyl acrylate, N-methylol(meth)acrylamide, N-hydroxy(meth)acrylamide, vinyl alcohol, allyl alcohol, 2-hydroxyethyl vinyl ether, 4-hydroxybutyl vinyl ether, and diethylene glycol monovinyl ether.

In the invention, the above-mentioned functional-group-containing vinyl monomers may be used alone, or may be used in the form of a mixture of two or more thereof. The content of the whole of the monomer(s) is from 0.01 to 10% by weight, preferably from 0.5 to 8% by weight, more preferably 1 to 5% by weight of the whole of the monomers of the (meth)acrylate polymer. If the content is less than 0.01% by weight, the adhesion to a substrate may lower. On the other hand, if the content is more than 10% by weight, the adhesive strength may become higher with time.

As the component (C) in the invention, a vinyl-based monomer copolymerizable with the component (A) and/or the component (B) is used. If necessary, the vinyl-based monomer copolymerizable with the component (A) and/or the component (B) is used in order to adjust the initial adhesive strength or the adhesive strength depending on time, adjust the cohesive strength, and attain other purposes.

As the copolymerizable vinyl-based monomer, for example, the following can be appropriately used: a cohesive strength/heat resistance improving component such as a sulfonic-acid-group-containing monomer, a phosphoric-acid-group-containing monomer, a cyano-group-containing monomer, a vinyl ester monomer, or an aromatic vinyl-based monomer; a component having a functional group acting to improve the adhesive strength or acting as a crosslinking base point, such as an amide-group-containing monomer, an amino-group-containing monomer, an imide-group-containing monomer, an epoxy-group-containing monomer, N-acryloylmorpholine, or a vinyl ether monomer; and a different (meth) acryl-based monomer having an alkyl group (alkyl (meth)acrylate). These monomer compounds may be used alone or may be used in the form of a mixture of two or more thereof.

Examples of the sulfonic-acid-group-containing monomer include styrenesulfonic acid, allylsulfonic acid, 2-(meth)acrylamide-2-methylpropanesulfonic acid, (meth)acrylamidepropanesulfonic acid, sulfopropyl (meth)acrylate, and (meth)acryloyloxynaphthalenesulfonic acid.

Examples of the phosphoric-acid-group-containing monomer include 2-hydroxyethylacryloyl phosphate.

Examples of the cyano-group-containing monomer include acrylonitrile, and methacrylonitrile.

Examples of the vinyl ester monomer include vinyl acetate, vinyl propionate, vinyl laurate, and vinyl pyrrolidone.

Examples of the aromatic vinyl-based monomer include styrene, chlorostyrene, chloromethylstyrene, α-methylstyrene, and benzyl (meth)acrylate.

Examples of the amide-group-containing monomer include acrylamide, methacrylamide, diethyl(meth)acrylamide, N-vinylpyrrolidone, N-vinyl-2-pyrrolidone, N-(meth)acryloylpyrrolidone, N,N-dimethylacrylamide, N,N-dimethylmethacrylamide, N,N-diethylacrylamide, N,N- diethylmethacrylamide, N,N'-methylenebisacrylamide, N,N-dimethylaminopropylacrylamide, and N,N-dimethylaminopropylmethacrylamide.

Examples of the amino-group-containing monomer include N,N-dimethylaminoethyl (meth)acrylate, N,N-dimethylaminopropyl (meth)acrylate, N-(meth)acryloylmorpholine, and aminoalkyl (meth)acrylates.

Examples of the imide-group-containing monomer include cyclohexylmaleimide, isopropylmaleimide, N-cyclohexylmaleimide, and itaconic imide.

Examples of the epoxy-group-containing monomer include glycidyl (meth)acrylate, and allyl glycidyl ether.

Examples of the vinyl ether monomer include methyl vinyl ether, ethyl vinyl ether, and isobutyl vinyl ether.

Examples of the different (meth)acryl-based monomer having an alkyl group include methyl (meth)acrylate, isobornyl (meth)acrylate, and silicon-atom-containing silane monomers.

In the invention, the other polymerizable monomers may be used alone or may be used in the form of a mixture of two or more thereof. The content of the whole of the monomer(s) is preferably from 0 to 49.9 parts by weight, more preferably from 0 to 44.9 parts by weight with respect to 100 parts by weight of the (meth) acryl-based polymer. If the content is more than 50% by weight, the initial adhesive strength may be low.

It is desired that the weight-average molecular weight of the (meth)acryl-based polymer used in the invention is 100000 or more, preferably 300000 or more, more preferably 500000 or more. If the weight-average molecular weight is less than 100000, the endurance is poor and the cohesive strength of the pressure-sensitive adhesive composition is small so that an adhesive residue tends to be generated. On the other hand, the weight-average molecular weight is preferably less than 5000000 from the viewpoint of workability. The weight-average molecular weight is a molecular weight obtained by measurement by GPC (gel permeation chromatography).

It is desired that the glass transition temperature (Tg) of the (meth)acryl-based polymer is 0° C. or lower (usually, −100° C. or higher), preferably −10° C. or lower since the adhesive performances are easily balanced. If the glass transition temperature is higher than 0° C., the polymer does not flow with ease so that the wettability to an adherend is insufficient. As a result, blisters tend to be caused between the adherend and the pressure-sensitive adhesive composition layer of the pressure-sensitive adhesive sheet. The glass transition temperature (Tg) of the (meth)acryl-based polymer can be adjusted into the above-mentioned range by varying the used monomer components or the composition ratio appropriately.

For the production of the (meth)acryl-based polymer, a known radical polymerization method can be appropriately selected, examples thereof including solution polymerization, bulk polymerization, and emulsion polymerization. The resultant (meth)acryl-based polymer may be any one selected from a random copolymer, block copolymer, a graft copolymer, and others.

As a polymerization solvent in the solution polymerization, for example, the following can be used: methyl ethyl ketone, acetone, ethyl acetate, tetrahydrofuran, dioxane, cyclohexanone, n-hexane, toluene, xylene, mesitylene, methanol, ethanol, n-propanol, isopropanol, water, and various aqueous solutions. The reaction is conducted usually at about 60 to 80° C. for about 4 to 10 hours in a current of an inert gas such as nitrogen.

The polymerization initiator, the chain transfer agent, and others that are used in the radical polymerization are not particularly limited, and can be appropriately selected for use.

Examples of the polymerization initiator used in the invention include azo initiators such as 2,2'-azobisisobutyronitrile 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine) disulfate, 2,2'-azobis(N,N'-dimethyleneisobutylamidine), and 2,2'-azobis[N-(2-carboxyethyl)-2-methylpropionamidine] hydrate (VA-057, manufactured by Wako Pure Chemical Industries, Ltd.); persulfates such as potassium persulfate, and ammonium persulfate; peroxide initiators such as di(2-ethylhexyl)peroxydicarbonate, di(4-t-butylcyclohexyl)peroxydicarbonate, di-sec-butyl peroxydicarbonate, t-butyl peroxyneodecanoate, t-hexyl peroxypivalate, t-butyl peroxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, t-butyl peroxyisobutyrate, 1,1-di(t-hexylperoxy)cyclohexane, t-butyl hydroperoxide, and hydrogen peroxide; redox initiators, wherein a peroxide is combined with a reducing agent, such as a combination of a persulfate with sodium hydrogen sulfite, and a combination of a persulfate with sodium ascorbate. However, the polymerization initiator is not limited thereto.

The polymerization initiators may be used alone or be used in the form of a mixture of two or more thereof. The content of the whole thereof is preferably from about 0.005 to 1 part by weight, more preferably from about 0.02 to 0.5 part by weight with respect to 100 parts by weight of the monomers.

In the invention, a chain transfer agent may be used in the polymerization. The use of the chain transfer agent makes it possible to adjust the molecular weight of the acryl-based polymer appropriately.

Examples of the chain transfer agent include laurylmercaptane, glycidylmercaptane, mercaptoacetic acid, 2-mercaptoethanol, thioglycolic acid, 2-ethylhexyl thioglycolate, and 2,3-dimercapto-1-propanol.

These chain transfer agents may be used alone or be used in the form of a mixture of two or more thereof. The content of the whole thereof is from about 0.01 to 0.1 part by weight with respect to 100 parts by weight of the monomers.

The re-peeling pressure-sensitive adhesive composition of the invention comprises, as a base polymer thereof, a (meth) acryl-based polymer as described above.

As the component (D) in the invention, a surfactant (which may be an emulsifier and) which has a molecular weight of 150 to 5000 is used.

Examples of the surfactant include anionic surfactants such as carboxylic acid salts, sulfonic acid salts, sulfuric ester salts, and phosphoric ester salts; nonionic surfactants such as surfactants of an ester type, an ether type, an ester/ether type, and an aliphatic alkanolamide type, wherein a hydrophobic group and a hydrophilic group are bonded to each other through an amide bond; and cationic surfactants such as surfactants of an amine salt type, and a quaternary ammonium salt type.

Specific examples thereof include anionic emulsifiers such as polyoxyethylene (abbreviated to P.O.E hereinafter) nonylphenyl ether phosphate, P.O.E. octylphenyl ether phosphate, polyoxyethylene alkyl ether, polyoxyethylene alkylphenyl ether, oxyethylene-oxypropylene block polymer, sorbitan aliphatic acid ester, alkyl sulfuric acid ester, alkylbenzene sulfate, alkyl sulfosuccinate, alkyldiphenyl ether disulfonate, polyoxyethylene alkyl sulfate, polyoxyethylene alkyl phosphate, sodium laurylsulfonate, ammonium laurylsulfate, sodium dodecylbenzenesulfonate, ammonium polyoxyethylene alky ether sulfate, and sodium polyoxyethylene alkylphenyl ether sulfate; and nonionic emulsifiers such as polyoxyethylene alkyl ether, polyoxyethylene alkylphenyl ether, polyoxyethylene aliphatic acid ester, and polyoxyethylene-polyoxypropylene block polymer.

Furthermore, specific examples of an emulsifier into which a radical polymerizable functional group such as a propenyl group or an allyl ether group is introduced, as a reactive emulsifier, include AQUALON HS-10, HS-20, KH-10, BC-05, BC-10, and BC-20 (manufactured by Dai-ichi Kogyo Seiyaku Co., Ltd.); and ADEKA REASOAP SE10N (manufactured by Asahi Denka Kogyo Co., Ltd.). The reactive emulsifier is preferred since the emulsifier is incorporated into the polymer chain after the monomers are polymerized so that the water resistance thereof becomes good.

These surfactants (emulsifiers) may be used alone or be used in the form of a mixture of two or more thereof. The content of the whole thereof is from 0.01 to 30 parts by weight, preferably from 0.05 to 20 parts by weight, more preferably from 0.1 to 10 parts by weight with respect to 100 parts by weight of the (meth)acryl-based polymer. If the content is less than 0.01% by weight, the contact-angle-recoverability may be poor. On the other hand, if the content is more than 30% by weight, contaminations may be generated on the surface of an adherend.

In particular, in the case of taking the contact-angle-recoverability into more consideration, it is preferred to use, as the surfactant of the component (D), a phosphate (i.e., a phosphoric ester) surfactant having a molecular weight of 150 to 5000.

Examples of the phosphate surfactant include polyoxyethylene (abbreviated to P.O.E. hereinafter) nonylphenyl ether phosphate, P.O.E. octylphenyl ether phosphate, P.O.E. dinonylphenyl ether phosphate, and P.O.E. dioctylphenyl ether phosphate, and polyoxyethylene alkyl phosphate. These phosphate surfactants may be used alone, or may be used in the form of a mixture of two or more thereof.

These phosphate surfactants can each be used in the form of a simple substance or a salt. Examples of the used salt form include sodium, potassium, barium, and triethanolamine salts. These phosphate surfactants may be used in the form of a simple article or a mixed article.

The manner for adding the phosphate surfactant(s) is not particularly limited, and may be, for example, a manner of attaining the blend thereof when the polymerization operation is conducted, or a manner of conducting the addition thereof to the acrylate polymer after the end of the polymerization.

The re-peeling pressure-sensitive adhesive composition of the invention becomes better in weather resistance, heat resistance and others by crosslinking the (meth)acryl-based polymer with a crosslinking agent. The crosslinking agent used in the invention may be a compound having in the molecule thereof two or more functional groups capable of reacting with (bonding to) the functional group of the above-mentioned functional-group-containing vinyl-based monomer. For example, the following can be used: a polyisocyanate compound, an epoxy compound, an oxazoline compound, a melamine resin, an aziridine derivative, and a metal chelate compound. These compounds may be used alone, or may be used in combination.

Examples of the polyisocyanate compound, out of these, include aromatic isocyanates such as tolylenediisocyanate and xylenediisocyanate, alicyclic isocyanates such as isophoronediisocyanate, aliphatic isocyanates such as hexamethylenediisocyanate, and emulsion type isocyanate.

More specifically, examples of the polyisocyanate include lower aliphatic polyisocyanates such as butylenediisocyanate and hexamethylenediisocyanate, alicyclic isocyanates such as cyclopentylenediisocyanate, cyclohexylenediisocyanate and isophoronediisocyanate, aromatic diisocyanates such as 2,4-tolylenediisocyanate, 4,4'-diphenylmethanediisocyanate and xylylenediisocyanate, a trimethylolpropane/tolylenediisocyanate trimer adduct (trade name: Coronate L, manufactured by Nippon Polyurethane Industry Co., Ltd.), a trimethylolpropane/hexamethylenediisocyanate trimer adduct (trade name: Coronate HL, manufactured by Nippon Polyurethane Industry Co., Ltd.), an isocyanurate product of hexamethylenediisocyanate (trade name: Coronate HX, manufactured by Nippon Polyurethane Industry Co., Ltd.), and a self-emulsification type polyisocyanate (trade name: AQUANATE 200, manufactured by Nippon Polyurethane Industry Co., Ltd.). These polyisocyanate compounds may be used alone or in the form of a mixture of two or more thereof.

Examples of the oxazoline compound include 2-oxazoline, 3-oxazoline, 4-oxazoline, 5-keto-3-oxazoline, and EPOCROS (manufactured by Nippon Shokubai Co., Ltd.). These compounds may be used or may be used in combination.

Examples of the epoxy compound include N,N,N',N'-tetraglycidyl-m-xylenediamine (trade name: TETRAD-X, manufactured by Mitsubishi Gas Chemical Co., Inc.), 1,3-bis (N,N-diglycidylaminomethyl)cyclohexane (trade name: TETRAD-C, manufactured by Mitsubishi Gas Chemical Co., Inc.), tetraglycidyldiaminodiphenylmethane, triglycidyl-p-aminophenol, diglycidylaniline, and diglycidyl-o-toluidine. These compounds may be used or may be used in combination.

Examples of the melamine resin include hexamethylolmelamine, and water-soluble melamine resins.

Examples of the aziridine derivative include a commercially available product trade-named HDU (manufactured by Sogo Pharmaceutical Co., Ltd.), that trade-named TAZM (manufactured by Sogo Pharmaceutical Co., Ltd.), and that trade-named TAZO (manufactured by Sogo Pharmaceutical Co., Ltd.). These compounds may be used or may be used in combination.

About the metal chelate compound, examples of its metal component include aluminum, iron, tin, titanium, and nickel, and examples of its chelate component include acetylene, methyl acetoacetate, and ethyl lactate. These compounds may be used or may be used in combination.

The used amount of the crosslinking agent(s) is appropriately selected in accordance with the balance with the (meth) acryl-based polymer to be crosslinked and the usage thereof as an pressure-sensitive adhesive sheet. In order to gain sufficient weather resistance and heat resistance by the cohesive strength of the (meth)acryl-based polymer, in general the agent is contained preferably in an amount of 1 to 10 parts by weight, more preferably in an amount of 2 to 8 parts by weight with respect to 100 parts by weight of the (meth)acryl-based polymer. If the content is less than 1 part by weight, the crosslink formation based on the crosslinking is insufficient so that the ratio of contents insoluble in the solvent tends to fall. Moreover, the cohesive strength of the pressure-sensitive adhesive composition is small so that an adhesive residue tend to be caused. On the other hand, if the content is more than 10 parts by weight, the initial adhesive strength of the pressure-sensitive adhesive layer is insufficient and further the cohesive strength of the polymer is large so that the fluidity lowers and the wettability onto an adherend is insufficient. As a result, the sheet may be peeled off.

In the pressure-sensitive adhesive composition of the invention, a weather-resistant stabilizer may be used in an amount of 0.1 to 6 parts by weight with respect to 100 parts by weight of the (meth)acryl-based polymer. The use causes the composition to exhibit excellent weather resistance, re-peeling property, and contact-angle-recoverability. The weather-resistant stabilizer is used preferably in an amount of 0.2 to 5 parts by weight, more preferably in an amount of 0.3 to 4 parts by weight, even more preferably in an amount of 0.4 to 3 parts by weight.

The weather-resistant stabilizer in the invention is an ultraviolet absorbent, a light stabilizer, or an antioxidant. These compounds may used, as the weather-resistant stabilizer, alone or in the form of a mixture of two or more thereof.

As the ultraviolet absorbent, a known ultraviolet absorbent may be appropriately used, examples of the absorbent including benzotriazole based ultraviolet absorbents, triazine based ultraviolet absorbents, and benzophenone based ultraviolet absorbents. These ultraviolet absorbents may be used alone or may be used in the form of a mixture of two or more thereof.

As the light stabilizer, a known light stabilizer may be appropriately used, examples of the light stabilizer including hindered amine light stabilizers, and benzoate based light stabilizers. These light stabilizers may be used alone or may be used in the form of a mixture of two or more thereof.

As the antioxidant, a known antioxidant may be appropriately used, examples of the antioxidant including hindered phenol antioxidants, phosphorus-containing process-heat stabilizers, lactone process-heat stabilizers, and sulfur-containing heat-resistant stabilizers. These antioxidants may be used alone or may be used in the form of a mixture of two or more thereof.

Furthermore, the re-peeling pressure-sensitive adhesive composition of the invention may contain other known additives such as a colorant, powders such as pigment, a dye, a surfactant, a plasticizer, a tackifier, a surface lubricant, a leveling agent, a softener, an inorganic or organic filler, a metal powder, and a granular or foil-form product in accordance with the usage. The blend amounts of these optional components may be use amounts that are ordinarily utilized in the field of surface protecting materials.

In the re-peeling pressure-sensitive adhesive composition of the invention, the change ratio y between adhesive strengths which is calculated out from the following expression (2) is preferably from 0.01 to 10:

$$y = Fb/Fa \quad (2)$$

wherein y: change ratio (−) between adhesive strengths, Fa: the initial adhesive strength (N/10-mm) onto the adherend having the photocatalytic layer, and Fb: the adhesive strength (N/10-mm) onto the adherend having the photocatalytic layer after the composition adhering to the adherend undergoes an accelerated weather resistance test.

The initial adhesive strength is measured, for example, as follows:

First, a produced adhesive tape (10 mm×100 mm) is attached to a photocatalyst-applied glass, and the tape is compressed thereto so as to form a sample (a) for evaluation.

Next, a universal tensile tester is used to peel the adhesive tape off from the evaluation sample (a) at a tensile speed of 300 mm/minute and a peel angle of 180°. The adhesive strength (N/10-mm) at this time is measured. This value is defined as the above-mentioned initial adhesive strength.

The above-mentioned adhesive strength after the accelerated weather resistance test is measured, for example, as follows:

First, a produced adhesive tape (10 mm×100 mm) is attached to a photocatalyst-applied glass, and the two are pressed to each other under pressure so as to form a sample (c) for evaluation.

The evaluation sample (c) is put into a sunshine carbon arc weather meter (WEL-3SUN-H, manufactured by Suga Test Instruments Co., Ltd., black panel temperature: 63° C., rain: 12 minutes per 60 minutes), and processed for 500 hours. Thereafter, the temperature of the system is returned to room temperature (about 25° C.) so as to yield a sample (c') for evaluation.

Next, a universal tensile tester is used to peel the adhesive tape off from the evaluation sample (c') at a tensile speed of 300 mm/minute and a peel angle of 180°. The adhesive strength (N/10-mm) at this time, that is, after the accelerated weather resistance test is measured. This value is defined as the above-mentioned adhesive strength after the accelerated weather resistance test.

The re-peeling pressure-sensitive adhesive composition of the invention is a composition having a structure as described above.

The re-peeling pressure-sensitive adhesive layer of the invention is a layer including a re-peeling pressure-sensitive adhesive composition as described above. The re-peeling pressure-sensitive adhesive layer of the invention can be made of a product obtained by crosslinking the above-mentioned re-peeling pressure-sensitive adhesive composition. At this time, the crosslinking of the pressure-sensitive adhesive composition is attained ordinarily after the pressure-sensitive adhesive composition is applied. The re-peeling pressure-sensitive adhesive layer including the crosslinked pressure-sensitive adhesive composition can be transferred onto a support or the like.

The method for forming the re-peeling pressure-sensitive adhesive layer onto a support (or a separator, a supporting film or the like) is not particularly limited. The layer is formed by, for example, a method of painting the pressure-sensitive adhesive composition onto a separator subjected to removing treatment, or the like, and then removing the polymerization solvent or the like by drying, thereby forming an pressure-sensitive adhesive layer onto the support, a method of painting the pressure-sensitive adhesive composition onto a support, and removing the polymerization solvent or the like by drying, thereby forming an pressure-sensitive adhesive layer onto the support, or some other method. Thereafter, ageing treatment may be conducted in order to adjust the shift of the components of the pressure-sensitive adhesive layer, adjust crosslinking reaction, or attain other purposes. When the pressure-sensitive adhesive composition is applied onto a support (or a separator, a supporting film or the like) to form an pressure-sensitive adhesive sheet, one or more solvents other than the polymerization solvent may newly be added to the composition in order that the composition can be uniformly applied onto the support (or the separator, the supporting film or the like).

Examples of the solvent used in the invention include methyl ethyl ketone, acetone, ethyl acetate, tetrahydrofuran, dioxane, cyclohexanone, n-hexane, toluene, xylene, mesitylene, methanol, ethanol, n-propanol, isopropanol, water, and various aqueous solutions. These solvents may be used alone or may be used in the form of a mixture of two or more thereof.

As the method for forming the re-peeling pressure-sensitive adhesive layer of the invention, there is used a known method used to produce an pressure-sensitive adhesive sheet. Specific examples thereof include roll coating, kiss roll coating, gravure coating, reverse coating, roll blush, spray coating, dip roll coating, bar coating, knife coating, air knife coating, and extrusion coating using a die coater.

The surface of the pressure-sensitive adhesive layer may be subjected to surface treatment such as corona treatment, plasma treatment, or ultraviolet treatment.

In the invention, the re-peeling pressure-sensitive adhesive layer is formed to have a thickness of about 2 to 500 µm, preferably about 5 to 100 µm after the layer is dried.

In the case that the adhesive makes its appearance onto such a surface, the pressure-sensitive adhesive layer may be protected with a sheet subjected to removing treatment (a removable sheet, a separator or a removable liner) until the layer is put to practical use.

Examples of the constituting material of the separator (the removable sheet or the removable liner) include plastic films such as polyethylene, polypropylene, polyethylene terephthalate, and polyester films, porous materials such as paper, cloth and nonwoven cloth, and appropriate sheet-form products such as a net, a foamed sheet, a metal foil and laminates thereof. The plastic films are preferably used since they are excellent in surface smoothness.

The film is not particularly limited as long as the film is a film capable of protecting the pressure-sensitive adhesive layer. Examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is usually from about 5 to 200 µm, preferably from about 5 to 100 µm.

If necessary, the separator may be subjected to releasing and antifouling treatment with a silicone, fluorine-containing, long-chain alkyl, or aliphatic acid amide releasing agent, or silica powder, or antistatic treatment of a paint type, a kneading type, a vapor-deposition type or some other type. When the surface of the separator is appropriately subjected to removing treatment such as silicone treatment, long-chain alkyl treatment or fluorine treatment, the re-peeling property from the pressure-sensitive adhesive layer can be made higher.

In the above-mentioned production process, the sheet subjected to the removing treatment (the removable sheet, the separator or the removable liner) can be used, as it is, as a separator for a pressure-sensitive adhesive sheet. Thus, the process can be made simple.

The re-peeling pressure-sensitive adhesive layer of the invention is a layer having a structure as described above.

The pressure-sensitive adhesive sheet of the invention is an pressure-sensitive adhesive sheet wherein a single face of a support has or both faces of the support each have a re-peeling pressure-sensitive adhesive layer which is formed thereon and has the above-mentioned structure.

The sheet in the invention means a planar material, and include, in the category thereof, products which are ordinarily called tapes and films.

Examples of the support used in the invention include plastic films such as a polyethylene film or a polyester film, and a porous material such as a paper and a nonwoven cloth.

More specific examples of the support include: a polyethylene resin layer using one or more out of low density polyethylene, high density polyethylene, linear low density polyethylene made from an α olefin component, and others; and a polyolefin resin layer using one or more out of propylene polymers (of a homo type, a block type, and a random type), propylene polymers blended with a rubber component in a reactor, and olefin polymers such as ethylene/propylene copolymer, propylene/α olefin copolymer, and ethylene/propylene/α olefin copolymer. In these resin layers, the individual resins may be used alone, or may be used in the form of a mixture of two or more thereof.

The content of the polyethylene resin in the support (resin layer) is preferably 30% or more by weight, more preferably 50% or more by weight, even more preferably 70% or more by weight. If the content of the polyethylene resin or the like is less than 30% by weight, the anchoring force to an adherend or the like falls. Thus, when the adhesive strength is made strong or the adhesive strength rises with time, an adhesive residue are easily generated. The resin layer (the support) may be a drawn resin or a non-drawn resin.

In the invention, it is particularly preferred that the support is a support made of a plastic substrate subjected to masking treatment. The masking treatment in the invention may be coloring with a pigment filler, kneading of a weather-resistant stabilizer, or the like.

The coloring with a pigment filler, and the kneading of a weather-resistant stabilizer (an ultraviolet absorbent, a light stabilizer or an antioxidant) are performed by painting treatment, transferring treatment, kneading or the like onto a surface of the substrate.

As the ultraviolet absorbent, a known ultraviolet absorbent may be appropriately used, examples of the absorbent including benzotriazole based ultraviolet absorbents, triazine based ultraviolet absorbents, and benzophenone based ultraviolet absorbents. These ultraviolet absorbents may be used alone or may be used in the form of a mixture of two or more thereof.

The added amount of the ultraviolet absorbent is preferably 5 parts or less by weight, more preferably 3 parts or less by weight, even more preferably from 0.1 to 1 part by weight with respect to 100 parts by weight of the base polymer of each of the resin layers.

As the light stabilizer, a known light stabilizer may be appropriately used, examples of the light stabilizer including hindered amine light stabilizers, and benzoate based light stabilizers. These light stabilizers may be used alone or may be used in the form of a mixture of two or more thereof.

The added amount of the light stabilizer is preferably 5 parts or less by weight, more preferably 3 parts or less by weight, even more preferably from 0.1 to 1 part by weight with respect to 100 parts by weight of the base polymer of each of the resin layers.

As the antioxidant, a known antioxidant may be appropriately used, examples of the antioxidant including hindered phenol antioxidants, phosphorus-containing process-heat stabilizers, lactone process-heat stabilizers, and sulfur-containing heat-resistant stabilizers. These antioxidants may be used alone or may be used in the form of a mixture of two or more thereof.

The added amount of the antioxidant is preferably 5 parts or less by weight, more preferably 3 parts or less by weight, even more preferably from 0.1 to 1 part by weight with respect to 100 parts by weight of the base polymer of each of the resin layers.

It is allowable to use, as the above-mentioned masking treatment, a manner of laminating a film having masking performance into the film or onto an outermost layer of the film.

It is also allowable to use, as the above-mentioned masking treatment, a manner of incorporating a filler, a pigment or the like into the plastic substrate, thereby causing the substrate to have masking performance.

The filler may be an inorganic filler. For example, carbon black, titanium oxide, zinc oxide or the like can be appropriately used. These inorganic fillers may be used alone or be used in the form of a mixture of two or more.

The added amount of the filler is preferably about 20 parts or less by weight, more preferably from 1 to 20 parts by weight, even more preferably from 5 to 15 parts by weight with respect to 100 parts by weight of the base polymer of each of the resin layers.

The ultraviolet transmittance of the masking-treated resin layer is preferably 5% or less, in particular preferably 1% or less at a wavelength of 365 nm.

In the invention, a resin layer having a multi-layered structure can be used as the support.

When consideration is taken particularly into outdoor use of the sheet, examples of the outermost layer of the resin layer, which has a multi-layered structure, include the following layers from the viewpoint of weather resistance and the prevention of blisters of the sheet when the sheet is attached to a photocatalyst-applied member (photocatalytic layer): a polyethylene resin layer using one or more out of low density polyethylene, high density polyethylene, linear low density polyethylene made from an α olefin component, and others; a polyolefin resin layer using one or more out of propylene polymers (of a homo type, a block type, and a random type), propylene polymers blended with a rubber component in a reactor, and olefin polymers such as ethylene/propylene copolymer, propylene/α olefin copolymer and ethylene/propylene/α olefin copolymer; and a polyester resin layer using one or more out of polyester polymers (of a homo type, a block type, and a random type) and others.

The content of the polyethylene resin(s) in the outmost layer is preferably 30% or more by weight, more preferably 50% or more by weight, even more preferably 70% or more by weight. If the content of the polyethylene resin(s) is less than 30% by weight, the anchoring force to the different layer or the like falls. Thus, when the adhesive strength is made strong or the adhesive strength rises with time, an adhesive residue are easily generated. The outermost layer may be a drawn resin or a non-drawn resin.

Examples of an intermediate layer of the resin layer having a multi-layered structure include thermoplastic resins each containing a polyolefin resin as a base polymer. Particularly preferred are resins layers each using: one or more out of propylene polymers (of a homo type, an ethylene-component-containing block type, a random type, and some other type), ethylene polymers (low density, high density, linear low density, and others), olefin polymers such as ethylene/a olefin copolymer, olefin polymers each made from ethylene and a different monomer, such as ethylene/vinyl acetate copolymer and ethylene/methyl methacrylate copolymer; and linear low-density polyethylene from the viewpoint of film-formation stability, the flexibility of the resin layer (the substrate layer), and tackiness between the outermost layer and the other layer.

The content of the polyethylene resin in the intermediate layer is preferably 30% or more by weight, more preferably 50% or more by weight, even more preferably 70% or more by weight. If the content of the polyethylene resin(s) is less than 30% by weight, the anchoring force to the outermost layer and the different layer or the like falls. Thus, when the adhesive strength is made strong or the adhesive strength rises with time, an adhesive residue are easily generated. Furthermore, when the sheet is used outdoors, blisters are easily generated. The intermediate layer may be a drawn resin or a non-drawn resin. These intermediate layers may be used alone or in combination of two or more thereof.

The thickness of the resin layer (the support) is generally from 5 to 300 μm, in particular from 20 to 100 μm. However, the thickness is not limited thereto.

One or more surfaces of the support (the resin layer) may be subjected to surface treatment such as corona treatment, plasma treatment, or ultraviolet treatment to improve the tackiness onto a back face treating agent, an adhesive, a primer coating agent or the like. The support (the resin layer) may be subjected to back face treatment.

If necessary, any additive can be incorporated into the resin layer (the support), examples of the additive including an antiblocking agent, a lubricant, titanium oxide, an organic or inorganic pigment for coloration, and an antioxidant, ultraviolet absorbent, light stabilizer or antistatic agent for preventing the layer from deteriorating.

In the case of using, in particular, a surface protecting film, it is preferred that the film is a resin film having heat resistance and solvent resistance as a support and having flexibility. When the supporting film (the support) has flexibility, an pressure-sensitive adhesive composition can be applied thereon by means of a roll coater or the like and the resultant can be wound into a roll form.

If necessary, the support (the resin layer) can be subjected to releasing and antifouling treatment with a silicone, fluorine-containing, long-chain alkyl or aliphatic acid amide releasing agent, silica powder, or the like, or to acid treatment, alkali treatment, primer treatment, or antistatic treatment of a paint type, a kneading type, a vapor deposition type, or some other type.

In the invention, the surface protecting material means a material for protecting a member having a photocatalytic layer indoors or outdoors, wherein one or more species of the above-mentioned pressure-sensitive adhesive sheet are used. Specific examples thereof include a photocatalyst-applied glass, a sound-proof wall for a highway, and an outer panel for a building, a housing or the like.

The invention, which has the above-mentioned structure, is a re-peeling pressure-sensitive adhesive composition which is excellent in weather resistance, re-peeling property and contact-angle-recoverability and is suitable for a surface protecting material for an adherend having a photocatalytic layer. Furthermore, the invention, in which a re-peeling pressure-sensitive adhesive layer comprising the pressure-sensitive adhesive composition is used, turns to an pressure-sensitive adhesive sheet and a surface protecting material which are small in a rise in the adhesive strength onto a photocatalytic layer with time, are capable of being peeled off with ease, and are good in the contact-angle-recoverability after they are used.

EXAMPLES

The following will describe Examples for demonstrating the structure and the advantageous effects of the invention specifically, and others. However, the invention is not limited thereto. About evaluation items in the Examples and the others, measurements described below were made.

<Measurement of Initial Adhesive Strength>

Each adhesive tape (10 mm×100 mm) formed was attached to a photocatalyst-applied glass (CLEARTECT, manufactured by Nippon Sheet Glass Co., Ltd.), and the two were bonded to each other under a pressure by a method of reciprocating a roller 2 kg in weight thereon once. The resultant was allowed to stand still at 23° C. and 50% RH for 20 minutes, so as to yield a sample (a) for evaluation.

Next, a universal tensile tester was used to peel the adhesive tape off from the evaluation sample (a) at a tensile speed of 300 mm/minute and a peel angle of 180°. The adhesive strength (N/10-mm) at this time was measured. The measurement was made at 23° C. and 65% RH.

<Evaluation of Antifouling Property>

After the universal tensile tester was used to peel the adhesive tape off from the evaluation sample (a) at the tensile speed of 300 mm/minute and the peel angle of 180°, the state of the photocatalyst-applied glass surface was observed and evaluated with the naked eye. The criterion for the evaluation is as follows:

Case where the generation of stainings (such as an adhesive residue) was not observed: ○

Case where the generation of stainings (such as an adhesive residue) was observed: x <Measurement of High-Speed Peel Adhesive Strength>

Each adhesive tape (10 mm×100 mm) formed was attached to a photocatalyst-applied glass (CLEARTECT, manufactured by Nippon Sheet Glass Co., Ltd.), and the two were bonded to each other under a pressure by a method of reciprocating a roller 2 kg in weight thereon once. The resultant was allowed to stand still at 23° C. and 50% RH for 20 minutes, so as to yield a sample (b) for evaluation.

Next, a universal tensile tester was used to peel the adhesive tape off from the evaluation sample (b) at a tensile speed of 30 m/minute and a peel angle of 180°. The adhesive strength (N/10-mm) at this time was measured. The measurement was made at 23° C. and 65% RH.

<Weather Resistance Evaluation>

Each adhesive tape (10 mm×100 mm) formed was attached to a photocatalyst-applied glass (CLEARTECT, manufactured by Nippon Sheet Glass Co., Ltd.), and the two were bonded to each other under a pressure by a method of reciprocating a roller 2 kg in weight thereon once. The resultant was allowed to stand still at 23° C. and 50% RH for 20 minutes, so as to yield a sample (c) for evaluation.

The evaluation sample (c) was put into a sunshine carbon arc weather meter (WEL-3SUN-H, manufactured by Suga Test Instruments Co., Ltd., black panel temperature: 63° C., rain: 12 minutes per 60 minutes), and processed for 500 hours. Thereafter, the temperature of the system was returned to room temperature (about 25° C.) so as to yield a sample (c') for evaluation.

Next, a universal tensile tester was used to peel the adhesive tape off from the evaluation sample (c') at a tensile speed of 300 mm/minute and a peel angle of 180°. The adhesive strength (N/10-mm) at this time, that is, after the accelerated weather resistance test was measured. The measurement was made at 23° C. and 65% RH.

A deterioration in the evaluation sample (c) in the above-mentioned processing step was also observed and evaluated. This evaluation was made by defining a time where a deterioration was observed as the deterioration time.

<Initial Contact Angle Measurement>

Each adhesive tape (10 mm×100 mm) formed was caused to adhere onto a photocatalyst-applied glass (CLEARTECT, manufactured by Nippon Sheet Glass Co., Ltd.) by hand, and the resultant was allowed to stand still at 23° C. and 50% RH for 3 days, so as to yield a sample (d) for evaluation.

Next, the protecting material (the adhesive tape) of the evaluation sample (d) was peeled off, and the resultant was allowed to stand still at 23° C. and 50% RH for 30 minutes. Thereafter, the initial contact angle with water was measured with a contact angle measuring device (Automatic Contact Angle Meter CA-X, manufactured by Kyowa Interface Science Co., Ltd.; a distilled water droplet 2 μm in size was dropped thereon, and after 0.1 second the contact angle was measured). The measurement was made at 23° C. and 50% RH.

<Measurement of Contact Angle After Irradiation with Ultraviolet Rays>

The protecting material (the adhesive tape) of the evaluation sample (d) was peeled off, and the resultant was irradiated with light for 24 hours by use of a black light fluorescent lamp (a black light fluorescent lamp manufactured by Matsushita Electric Industrial Co., Ltd. and capable of emitting light having an FWHM of 40 nm at a peak wavelength of 352 nm, straight tube type, 20 W). At this time, an ultraviolet illumination photometer (UVR-2 (light receiving region: UD-36), manufactured by Topcon Corp. and equipped with a light receiving unit exhibiting a peak sensitivity wavelength of about 360 nm) was used to decide the positional relationship between the test piece and the black light to give a UV intensity of 1 mW/cm$^2$ onto the surface of the test piece.

Next, the protecting material (the adhesive tape) of the evaluation sample (d) was peeled off, and the resultant was allowed to stand still at 23° C. and 50% RH for 30 minutes. Thereafter, the initial contact angle with water was measured with the contact angle measuring device (Automatic Contact Angle Meter CA-X, manufactured by Kyowa Interface Science Co., Ltd.; a distilled water droplet 2 μm in size was dropped thereon, and after 0.1 second the contact angle was measured). The measurement was made at 23° C. and 50% RH.

<Preparation of (Meth)Acryl-Based Polymers>

[Acryl-Based Polymer (A)]

A reactor equipped with stirring fans, a thermostat, a nitrogen gas introducing pipe and a condenser tube were charged with 58 parts by weight of butyl acrylate (BA), 40 parts by weight of butyl (meth)acrylate (BMA), 2 parts by weight of acrylic acid (AA), 0.03 part by weight of 2,2'-azobis(2-methylpropionamidine)dihydrochloride as a polymerization initiator, 2 parts by weight of an ethylenic-double-bond-containing anionic surfactant illustrated as Formula 1 (AQUALON BC-2020, manufactured by Dai-ichi Kogyo Seiyaku Co., Ltd.) as an emulsifier, and 100 parts by weight of water, and then nitrogen gas was introduced thereinto while the solution was gently stirred. In this way, the reactor was purged with nitrogen. Thereafter, a polymerization reaction was conducted for 10 hours while the temperature of the solution in the flask was kept near 50° C. Next, a 10% ammonia water was used to adjust the pH into 8 to prepare a solution of an acryl-based polymer (A) (solid content: 50% by weight), which was a polymer emulsion.

[Formula 1]

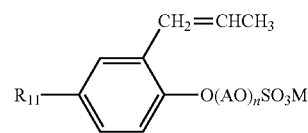

In the above-mentioned formula, $R_{11}$: an alkyl group containing an ammonium group, AO: ethylene oxide, M: an ammonium salt, and n=20.

[Acryl-Based Polymer (B)]

A reactor equipped with stirring fans, a thermostat, a nitrogen gas introducing pipe and a condenser tube were charged with 49 parts by weight of 2-ethylhexyl acrylate (2EHA), 49 parts by weight of butyl methacrylate (BMA), 2 parts by weight of acrylic acid (AA), 0.2 part by weight of ammonium persulfate as a polymerization initiator, 2 parts by weight of an ethylenic-double-bond-containing anionic surfactant illustrated as Formula 2 (AQUALON BC-2020, manufactured by Dai-ichi Kogyo Seiyaku Co., Ltd.) as an emulsifier, and 100 parts by weight of water, and then nitrogen gas was introduced thereinto while the solution was gently stirred. In this way, the reactor was purged with nitrogen. Thereafter, a polymerization reaction was conducted for 10 hours while the temperature of the solution in the flask was kept near 50° C. Next, a 10% ammonia water was used to adjust the pH into 8 to prepare a solution of an acryl-based polymer (B) (solid content: 50% by weight), which was a polymer emulsion.

[Formula 2]

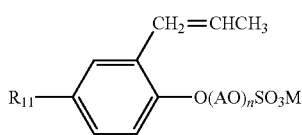

In the above-mentioned formula, $R_{11}$: an alkyl group containing an ammonium group, AO: ethylene oxide, M: an ammonium salt, and n=20.

[Acryl-Based Polymer (C)]

A reactor equipped with stirring fans, a thermostat, a nitrogen gas introducing pipe and a condenser tube were charged with 49 parts by weight of 2-ethylhexyl acrylate (2EHA), 49 parts by weight of butyl methacrylate (BMA), 2 parts by weight of acrylic acid), 0.03 part by weight of 2,2'-azobis(2-methylpropionamidine) dihydrochloride as a polymerization initiator, 2 parts by weight of an ethylenic-double-bond-containing anionic surfactant illustrated as Formula 3 (AQUALON BC-2020, manufactured by Dai-ichi Kogyo Seiyaku Co., Ltd.) as an emulsifier, and 100 parts by weight of water, and then nitrogen gas was introduced thereinto while the solution was gently stirred. In this way, the reactor was purged with nitrogen. Thereafter, a polymerization reaction was conducted for 10 hours while the temperature of the solution in the flask was kept near 50° C. Next, a 10% ammonia water was used to adjust the pH into 8 to prepare a solution of an acryl-based polymer (C) (solid content: 50% by weight), which was a polymer emulsion.

[Formula 3]

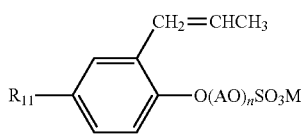

In the above-mentioned formula, $R_{11}$: an alkyl group containing an ammonium group, AO: ethylene oxide, M: an ammonium salt, and n=20.

[Acryl-Based Polymer (D)]

A reactor equipped with stirring fans, a thermostat, a nitrogen gas introducing pipe and a condenser tube were charged with 58 parts by weight of butyl acrylate (BA), 40 parts by weight of butyl methacrylate (BMA), 2 parts by weight of acrylic acid, 0.03 part by weight of 2,2'-azobis(2-methylpropionamidine)dihydrochloride as a polymerization initiator, 2 parts by weight of an ethylenic-double-bond-containing anionic surfactant illustrated as Formula 4 (AQUALON BC-2020, manufactured by Dai-ichi Kogyo Seiyaku Co., Ltd.) as an emulsifier, and 100 parts by weight of water, and then nitrogen gas was introduced thereinto while the solution was gently stirred. In this way, the reactor was purged with nitrogen. Thereafter, a polymerization reaction was conducted for 10 hours while the temperature of the solution in the flask was kept near 50° C. Next, a 10% ammonia water was used to adjust the pH into 8 to prepare a solution of an acryl-based polymer (D) (solid content: 50% by weight), which was a polymer emulsion.

[Formula 4]

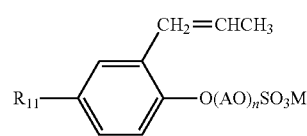

In the above-mentioned formula, $R_{11}$: an alkyl group containing an ammonium group, AO: ethylene oxide, M: an ammonium salt, and n=20.

[Acryl-Based Polymer (E)]

A reactor equipped with stirring fans, a thermostat, a nitrogen gas introducing pipe and a condenser tube were charged with 100 parts by weight of butyl acrylate (BA), 5 parts by weight of acrylic acid (AA), 0.2 part by weight of benzoyl peroxide as a polymerization initiator, and 245 parts by weight of toluene, and then nitrogen gas was introduced thereinto while the solution was gently stirred. In this way, the reactor was purged with nitrogen. Thereafter, a polymerization reaction was conducted for 24 hours while the temperature of the solution in the flask was kept near 60° C. In this way, an acryl-based polymer (E) solution (solid content: 30% by weight) was prepared.

[Acryl-Based Polymer (F)]

A reactor equipped with stirring fans, a thermostat, a nitrogen gas introducing pipe and a condenser tube were charged with 85 parts by weight of butyl acrylate (BA), 2.5 parts by weight of acrylic acid (AA), 15 parts by weight of acrylonitrile (AN), 0.1 part by weight of azobisisobutyronitrile as a polymerization initiator, and 240 parts by weight of toluene, and then nitrogen gas was introduced thereinto while the solution was gently stirred. In this way, the reactor was purged with nitrogen. Thereafter, a polymerization reaction was conducted for 24 hours while the temperature of the solution in the flask was kept near 50° C. In this way, an acryl-based polymer (F) solution (solid content: 30% by weight) was prepared.

Example 1

(Preparation of Adhesive Solution)

To 100 parts by weight of the solid content in the acryl-based polymer (A) solution were added 0.3 part by weight of a surfactant having a structure illustrated as Formula 5 (molecular weight: 479), 0.3 part by weight of a surfactant having a structure illustrated as Formula 6 (molecular weight: 857), 1 part by weight of a hindered amine light stabilizer having a tertiary amine structure (TINUVIN 765, manufactured by Ciba Specialty Chemicals Inc., a mixture of 1,2,2,6,6-pentamethyl-4-piperidinyl cebacate and methyl-1,2,2,6,6-pentamethyl-4-piperidinyl cebacate), 0.5 part by weight of TINUVIN 213 (a reaction product of methyl-3-(3-(2H-benzotriazole-2-yl)-5-tert-butyl-4-hydroxyphenyl) propionate/polyethylene glycol 300, manufactured by Ciba Specialty Chemicals Inc., and 2 parts by weight of an oxazoline-group-containing water-soluble crosslinking agent (WS-500, manufactured by Nippon Shokubai Co., Ltd., oxazoline group equivalent: 220 g solid/eq.) as a crosslinking agent. The components were mixed and stirred into a homogeneous form, so as to prepare an acrylic adhesive solution (1)

[Formula 5]

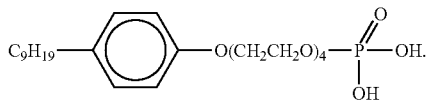

Molecular weight: 479

[Formula 6]

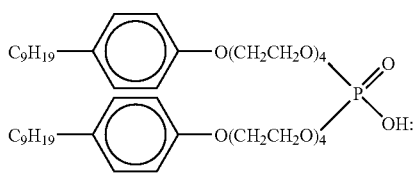

Molecular weight: 857

(Formation of Pressure-Sensitive Adhesive Sheet)

The acrylic adhesive solution (1) was applied onto a corona-treated surface of a low density polyethylene (LDPE) film (thickness: 60 μm), and then the resultant was heated at 80° C. for 5 minutes to form an pressure-sensitive adhesive layer, the thickness of the dried layer being 10 μm.

Next, a non-corona-treated surface of the same low density polyethylene (LDPE) film as described above was caused to adhere onto the pressure-sensitive adhesive layer to form an pressure-sensitive adhesive sheet.

Reference Example 1

(Preparation of Adhesive Solution)

To 100 parts by weight of the solid content in the acryl-based polymer (B) were added 0.3 part by weight of a surfactant having a structure illustrated as Formula 7 (molecular weight: 444), and 2 parts by weight of an oxazoline-group-containing water-soluble cross linking agent (WS-500, manufactured by Nippon Shokubai Co., Ltd., oxazoline group equivalent: 220 g solid/eq.) as a crosslinking agent. The components were mixed and stirred into a homogeneous form, so as to prepare an acrylic adhesive solution (2).

[Formula 7]

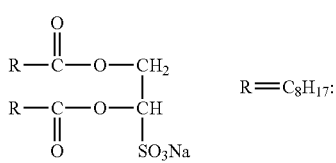

Molecular weight: 444

(Formation of Pressure-Sensitive Adhesive Sheet)

The acrylic adhesive solution (2) was applied onto a corona-treated surface of a low density polyethylene (LDPE) film (thickness: 60 μm), and then the resultant was heated at 80° C. for 5 minutes to form an pressure-sensitive adhesive layer, the thickness of the dried layer being 10 μm.

Next, a non-corona-treated surface of the same low density polyethylene (LDPE) film as described above was caused to adhere onto the pressure-sensitive adhesive layer to form an pressure-sensitive adhesive sheet.

Example 2

(Preparation of Adhesive Solution)

To 100 parts by weight of the solid content in the acryl-based polymer (C) solution were added 0.05 part by weight of a surfactant having a structure illustrated as Formula 8 (molecular weight: 479), 0.05 part by weight of a surfactant having a structure illustrated as Formula 9 (molecular weight: 857), and 4 parts by weight of an oxazoline-group-containing water-soluble crosslinking agent (WS-500, manufactured by Nippon Shokubai Co., Ltd., oxazoline group equivalent: 220 g solid/eq.) as a crosslinking agent. The components were mixed and stirred into a homogeneous form, so as to prepare an acrylic adhesive solution (3).

[Formula 8]

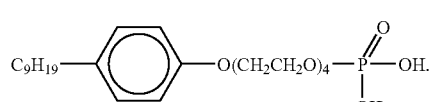

Molecular weight: 479

[Formula 9]

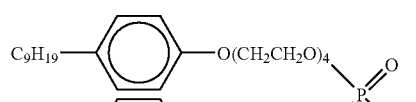

Molecular weight: 857

(Formation of Pressure-Sensitive Adhesive Sheet)

The acrylic adhesive solution (3) was applied onto a corona-treated surface of a film (thickness: 45 μm) having a layer structure of low density polyethylene (LDPE)/random polypropylene/low density polyethylene (LDPE) (layer ratio: 1/4/1), and then the resultant was heated at 80° C. for 5 minutes to form an pressure-sensitive adhesive layer, the thickness of the dried layer being 10 μm.

Next, a non-corona-treated surface of the same film as described above was caused to adhere onto the pressure-sensitive adhesive layer to form an pressure-sensitive adhesive sheet.

Example 3

(Preparation of Adhesive Solution)

To 100 parts by weight of the solid content in the acryl-based polymer (D) solution were added 0.3 part by weight of a surfactant having a structure illustrated as Formula 10 (molecular weight: 479), 0.3 part by weight of a surfactant having a structure illustrated as Formula 10 (molecular weight: 857), and 4 parts by weight of an oxazoline-group-containing water-soluble crosslinking agent (WS-500, manufactured by Nippon Shokubai Co., Ltd., oxazoline group equivalent: 220 g solid/eq.) as a crosslinking agent. The components were mixed and stirred into a homogeneous form, so as to prepare an acrylic adhesive solution (4).

[Formula 10]

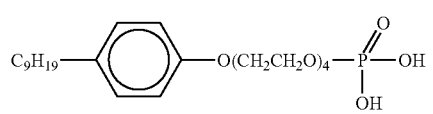

Molecular weight: 479

-continued

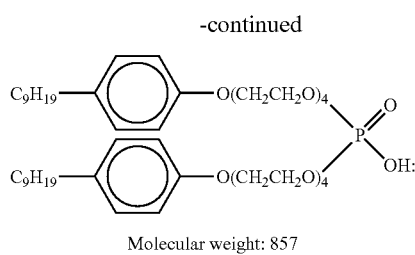

[Formula 11]

Molecular weight: 857

(Formation of Pressure-Sensitive Adhesive Sheet)

The acrylic adhesive solution (4) was applied onto a corona-treated surface of a film (thickness: 45 μm) having a layer structure of low density polyethylene (LDPE)/random polypropylene/low density polyethylene (LDPE) (layer ratio: 1/4/1), and then the resultant was heated at 80° C. for 5 minutes to form an pressure-sensitive adhesive layer, the thickness of the dried layer being 10 μm.

Next, a non-corona-treated surface of the same film as described above was caused to adhere onto the pressure-sensitive adhesive layer to form an pressure-sensitive adhesive sheet.

Comparative Example 1

(Preparation of Adhesive Solution)

To 100 parts by weight of the solid content in the acryl-based polymer (E) solution were added 6 parts by weight of an epoxy crosslinking agent (tetraglycidyl-1,3-bisaminomethylcyclohexane, manufactured by Mitsubishi Gas Chemical Co., Inc. as a crosslinking agent. The components were mixed and stirred into a homogeneous form, so as to prepare an acrylic adhesive solution (5).

(Formation of Pressure-Sensitive Adhesive Sheet)

The acrylic adhesive solution (5) was applied onto a corona-treated surface of a low density polyethylene (LDPE) film (thickness: 60 μm), which had as one side thereof the corona-treated surface, and then the resultant was heated at 80° C. for 3 minutes to form an pressure-sensitive adhesive layer, the thickness of the dried layer being 5 μm.

Next, a non-corona-treated surface of the same film as described above was caused to adhere onto the pressure-sensitive adhesive layer to form an pressure-sensitive adhesive sheet.

Comparative Example 2

(Preparation of Adhesive Solution)

To 100 parts by weight of the solid content in the acryl-based polymer (F) solution were added 60 parts by weight of dioctyl phthalate (DOP) (manufactured by Kyowa Yuka Co., Ltd.), and 5 parts by weight of an epoxy crosslinking agent (tetraglycidyl-1,3-bisaminomethylcyclohexane, manufactured by Mitsubishi Gas Chemical Co., Inc.). The components were mixed and stirred into a homogeneous form, so as to prepare an acrylic adhesive solution (6).

(Formation of Pressure-Sensitive Adhesive Sheet)

The acrylic adhesive solution (6) was applied onto one side of a vinyl chloride film (thickness: 70 μm), the single surface being not corona-treated but the other surface being corona-treated. Separately, a silicone back face treating agent was applied onto the corona-treated surface. The resultant was then heated at 80° C. for 3 minutes to form an pressure-sensitive adhesive layer, the thickness of the dried layer being 10 μm.

Next, the above-mentioned pressure-sensitive adhesive layer was caused to adhere onto the surface treated with the silicone back face treating agent to form an pressure-sensitive adhesive sheet.

The adhesive strengths (the initial adhesive strengths) of the pressure-sensitive adhesive sheets produced in accordance with the above-mentioned methods were measured, and the following evaluations were made: the peel adhesive strengths, staining property evaluation, weather resistance evaluation (the deterioration time, and the adhesive strength after the accelerated weather resistance test), and contact angle evaluation (the initial contact angle, and the contact angle after the accelerated weather resistance test). The resultant results are shown in Table 1.

TABLE 1

| | | Example 1 | Reference Example 1 | Example 2 | Example 3 | Comparative Example 1 | Comparative Example 2 |
|---|---|---|---|---|---|---|---|
| Composition | 2EHA | — | 49 | 49 | — | — | — |
| | BA | 58 | — | — | 58 | 100 | 85 |
| | BMA | 40 | 49 | 49 | 40 | — | — |
| | AN | — | — | — | — | — | 15 |
| | AA | 2 | 2 | 2 | 2 | 5 | 2.5 |
| Surfactant | | 0.6 | 0.3 | 0.1 | 0.6 | — | — |
| Another additive | DOP | — | — | — | — | — | 60 |
| Substrate layer (support) | Monolayer | LDPE | LDPE | — | — | LDPE | PVC |
| | Multilayer | — | — | PE/PP/PE | PE/PP/PE | — | — |
| Adhesive strength evaluation | Initial adhesive strength [N/10-mm] | 1.1 | 1.1 | 1.0 | 1.0 | 0.5 | 0.3 |
| Re-peeling property evaluation | High-speed peel adhesive strength [N/10-mm] | 0.6 | 0.3 | 0.2 | 0.5 | 0.8 | 2.4 |
| Antifouling property evaluation | | ○ | ○ | ○ | ○ | ○ | ○ |
| Weather resistance evaluation | Deterioration time (hr) | 500 or more | 150 | 500 or more | 500 or more | 100 | 500 or more |
| | Adhesive strength [N/10-mm] after accelerated weather resistance test | 1.5 | — | 1.8 | 1.8 | — | 5.7 |

TABLE 1-continued

|  |  | Example 1 | Reference Example 1 | Example 2 | Example 3 | Comparative Example 1 | Comparative Example 2 |
|---|---|---|---|---|---|---|---|
| Contact angle evaluation (°) | Initial contact angle (°) | 69 | 50 | 69 | 75 | 62 | 73 |
|  | Contact angle (°) after irradiation with ultraviolet rays | 11 | 11 | 17 | 14 | 34 | 69 |

It is understood from the results in Table 1 that in the case of using any one of the pressure-sensitive adhesive sheets produced according to the invention (Examples 1 to 3, and Reference Example 1), the contact-angle-recoverability was excellent in any one of Examples and Reference Examples and further the re-peeling property and the staining property were also excellent. Furthermore, it is understood that: in any one of Examples, the difference between the initial adhesive strength onto the adherend having the photocatalytic layer and the adhesive strength after the accelerated weather resistance test was small (a change in the adhesive strength was in the range of 0.01 to 10; and an increase in the adhesive strength was hardly observed when the sheet was caused to adhere onto the adherend (weather resistance).

On the other hand, in the case of using no surfactant (Comparative Examples 1 to 2), the following results were obtained: the contact-angle-recoverability was insufficient and the endurance (the deterioration time and the suppression of an increase in the adhesive strength after the accelerated weather resistance test) was also insufficient in any one of Comparative Examples. Thus, it is evident that Comparative Examples are unsuitable for pressure-sensitive adhesive sheets.

It is understood from the above that the pressure-sensitive adhesive sheet of the invention is excellent in weather resistance, re-peeling property and contact-angle-recoverability, and is suitable for a surface protecting material for an adherend having a photocatalytic layer.

The invention claimed is:

1. A re-peeling pressure-sensitive adhesive composition, which is used for a surface protecting material for an adherend having a photocatalytic layer, comprising:
    a (meth)acryl-based polymer; and
    a surfactant;
    wherein the surfactant has a molecular weight of 150 to 5000, in an amount from 0.01 to 30 parts by weight with respect to 100 parts by weight of the (meth)acryl-based polymer; and
    wherein the (meth)acryl-based polymer comprises, as monomer units:
        50 to 99.9% by weight of (A) at least one acrylate-based monomer represented by the following general formula (1): $CH_2=CR_1COOR_2$, wherein $R_1$ represents a hydrogen atom or a methyl group, and $R_2$ represents an alkyl group having 2 to 14 carbon atoms;
        0.1 to 10% by weight of (B) a functional-group-containing vinyl-based monomer; and
        0 to 49.9% by weight of (C) a vinyl-based monomer copolymerizable with the component (A) and/or the component (B), wherein the surfactant is phosphoric ester surfactant.

2. The re-peeling pressure-sensitive adhesive composition according to claim 1, which further comprises 0.1 to 6 parts by weight of a weather-resistant stabilizer with respect to 100 parts by weight of the (meth)acryl-based polymer.

3. The re-peeling pressure-sensitive adhesive composition according to claim 2, wherein the change ratio y between adhesive strengths, which is calculated out from the following expression (2) is from 0.01 to 10:

$$y=Fb/Fa \qquad (2)$$

wherein y: change ratio (–) between adhesive strengths, Fa: the initial adhesive strength (N/10-mm) onto the adherend ham the photocatalytic layer, and Fb: the adhesive strength (N/10-mm) onto the adherend having the photocatalytic layer after the composition adhering to the adherend undergoes an accelerated weather resistance test.

4. The re-peeling pressure-sensitive adhesive composition according to claim 1, wherein the weight-average molecular weight of the (meth)acryl-based polymer is from 100,000 to 5,000,000.

5. The re-peeling pressure-sensitive adhesive composition according to claim 1, wherein the glass transition temperature (Tg) of the (meth)acryl-based polymer is 0° C. or lower.

6. The re-peeling pressure-sensitive adhesive composition according to claim 1, wherein the (meth)acryl-based polymer further comprises a crosslinking agent in an amount of 1 to 10 parts by weight with respect to 100 parts by weight of the (meth)acryl-based polymer.

7. The re-peeling pressure-sensitive adhesive composition of claim 1, wherein the surfactant has a structure represented by Formula (5) or Formula (6):

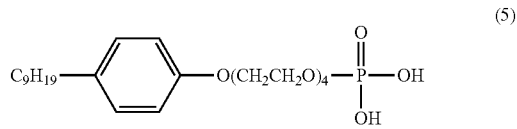

(5)

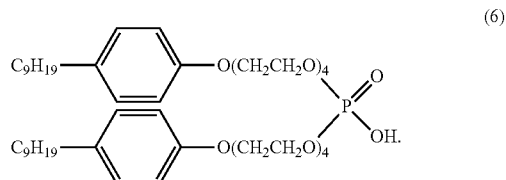

(6)

8. The re-peeling pressure-sensitive adhesive composition of claim 1, wherein the re-peeling pressure-sensitive adhesive composition has a contact angle recovery of greater than 30° and a high speed peel adhesive strength of less than 0.8 N/10-mm.

* * * * *

UNITED STATES PATENT AND TRADEMARK OFFICE
CERTIFICATE OF CORRECTION

| | | |
|---|---|---|
| PATENT NO. | : 7,968,189 B2 | |
| APPLICATION NO. | : 11/816900 | |
| DATED | : June 28, 2011 | |
| INVENTOR(S) | : Takeshi Yamanaka and Kooki Ooyama | |

It is certified that error appears in the above-identified patent and that said Letters Patent is hereby corrected as shown below:

At column 1, line 44-45, please change "is The surface of the photocatalyst is activated when the surface is" to --is--.

At column 8, line 35-36, please change "laurylmercaptane, glycidylmercaptane," to --laurylmercaptan, glycidylmercaptan,--.

At column 20, line 57, please change "cebacate" to --sebacate--.

At column 20, line 58, please change "cebacate)," to --sebacate),--.

At column 20, line 67, please change "solution (1)" to --solution (1).--.

At column 26, line 22, in Claim 3, please change "ham" to --having--.

Signed and Sealed this
Seventeenth Day of January, 2012

David J. Kappos
*Director of the United States Patent and Trademark Office*